United States Patent [19]

Donaldson

[11] 4,226,436
[45] Oct. 7, 1980

[54] APPLICATION FOR LOCKING DEVICE FOR TELESCOPING REACHES OF LOGGING TRAILERS

[76] Inventor: Jack D. Donaldson, 134 Beville Rd., Chehalis, Wash. 98532

[21] Appl. No.: 927,728

[22] Filed: Jul. 24, 1978

[51] Int. Cl.³ ............................................. B62D 53/00
[52] U.S. Cl. .................................. 280/404; 280/482; 403/31; 403/109
[58] Field of Search ..................... 280/404, 482; 92/24, 92/26, 27, 28, 51; 248/354 H, 355; 403/104, 109, 31; 188/67, 78, 216

[56] References Cited

U.S. PATENT DOCUMENTS

| | | | |
|---|---|---|---|
| 3,087,744 | 4/1963 | Tanenbaum | 280/404 |
| 3,135,361 | 6/1964 | Roberto | 188/216 |
| 3,181,881 | 5/1965 | Raden | 280/404 |
| 3,326,573 | 6/1967 | Neitzey | 280/482 |
| 3,972,540 | 8/1976 | Donaldson | 280/404 |

*Primary Examiner*—John J. Love
*Assistant Examiner*—Randall A. Schrecengost
*Attorney, Agent, or Firm*—Eugene D. Farley

[57] ABSTRACT

A device for logging trailers which have telescoping reaches providing for adjustment of the length of the trailer reach. The device is an expandable compressed air chamber positioned within the inner reach near the end contained by the outer reach. Four shoes are retained in contact with the expandable chamber. The shoes are provided with friction material adapted to contact the inner walls of the outer reach through openings in the walls of the inner reach. Compressed air is supplied to the expandable chamber through a hose from the truck cab. The truck operator is able to lock the inner reach relative to the outer reach at a desired length by control from the cab.

5 Claims, 6 Drawing Figures

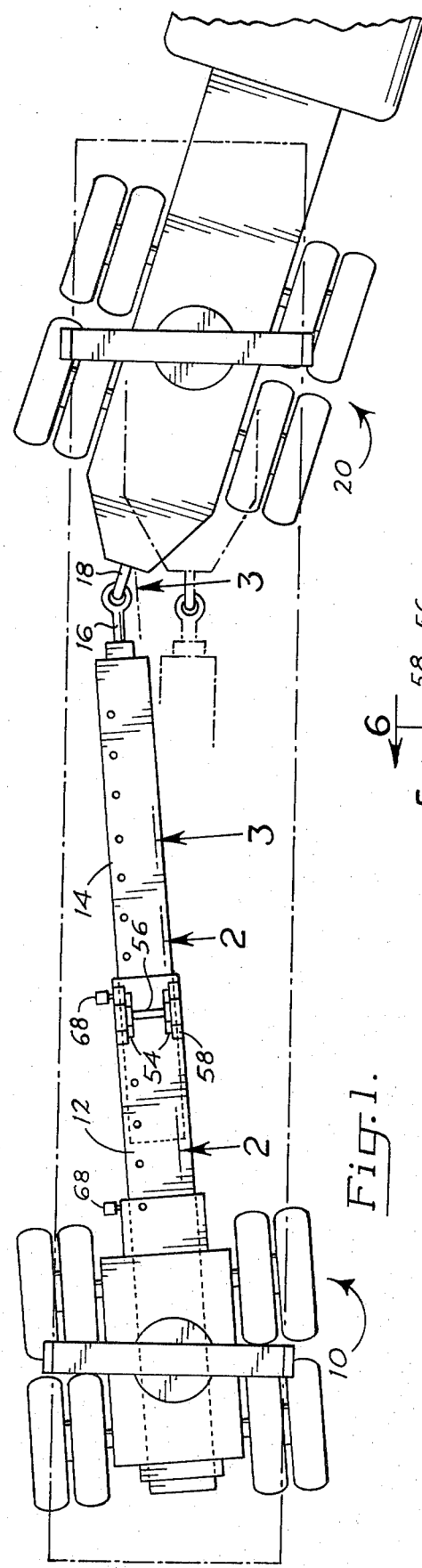
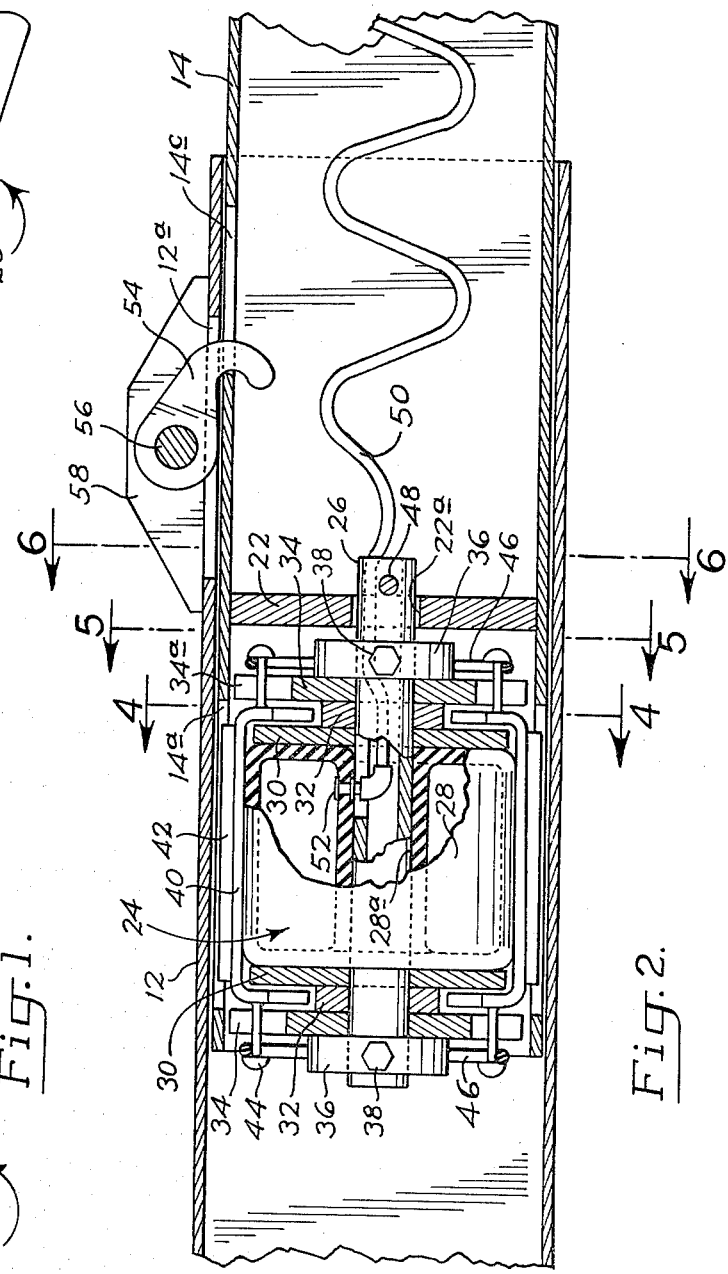

APPLICATION FOR LOCKING DEVICE FOR TELESCOPING REACHES OF LOGGING TRAILERS

BACKGROUND OF THE INVENTION

This invention relates to logging truck-trailer combinations. It pertains particularly to logging trailers having telescoping reaches providing for over-all length adjustment between the truck and trailer.

In the logging industry the truck and trailer combination is returned to the log loading site, customarily with the trailer separated from the truck and riding on it piggy-back with the trailer reach fully telescoped. At the log loading site the trailer is unloaded from the truck and coupled to it. It is then necessary to adjust the over-all length of the trailer to accommodate the length of the logs to be loaded.

With conventional logging trailers the length adjustment of the telescoping reaches is accomplished by removal of a pin positioned in holes extending through the inner and outer reach. The truck is then moved forward to extend or withdraw the inner reach from the outer reach to achieve the desired length. The driver must then inspect the telescoping reaches to determine the alignment of the holes preparatory to re-insertion of the pin and move the truck forward or back to obtain alignment of the holes. Performing this task alone is tedious and time consuming. A helper may be used for this function but this places the helper in a hazardous position and requires the services of two persons.

It accordingly is the general purpose of the present invention to provide a device that will permit the adjustment of the length of the telescoping reaches through remote control by the truck driver from the cab of the truck.

It is a further object of the present invention to provide a device that will maintain the reaches in locked position until the trailer is positioned for log loading.

It is a further object of the present invention to provide a device that will automatically limit the maximum extension of the reach.

It is a further object of the present invention to provide a device that will provide additional locking of the telescoping reach when heavy draw loads are encountered during normal log hauling.

It is a further object of the present invention to provide a device that will employ the elements of my prior patent, U.S. Pat. No. 3,972,540.

It is a further object of the present invention to provide a device that will function in cooperation with the attachment of my prior patent, U.S. Pat. No. 3,972,540.

The objects of the invention are further achieved by providing apparatus for accomplishing the foregoing functions.

BRIEF DESCRIPTION OF THE DRAWINGS

FIG. 1 is a fragmentary plan view of a logging truck-trailer combination provided with the device of my invention.

FIG. 2 is a sectional elevational view along the line 2—2 of FIG. 1.

GENERAL STATEMENT OF THE INVENTION

Figure 3:
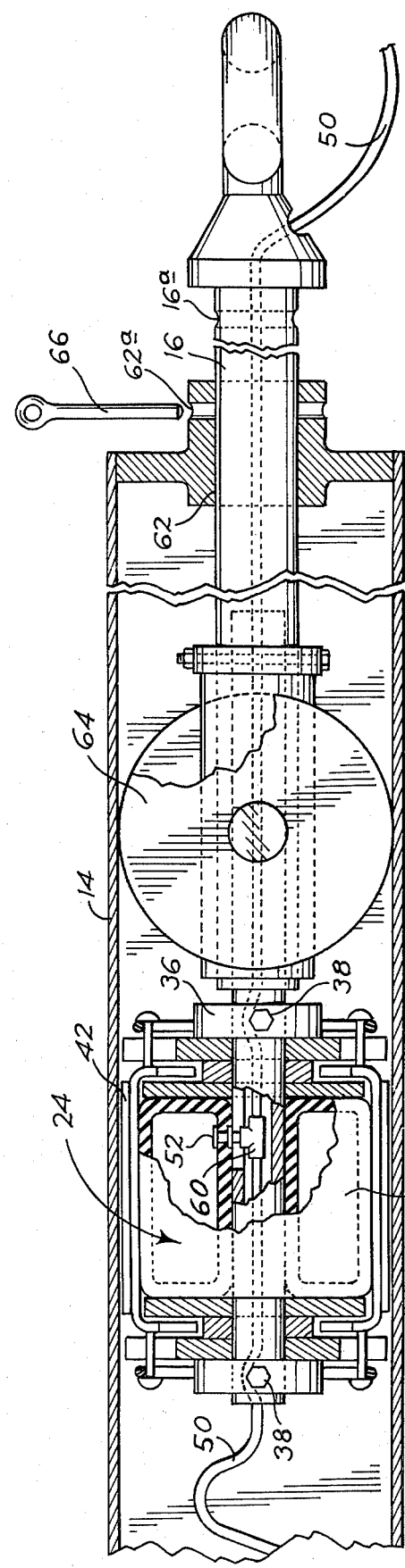
FIG. 3 is a sectional elevational view along the line 3—3 of FIG. 1.

The present invention generally provides a remote control device for friction locking the inner reach to the outer reach of a telescoping logging trailer reach, thereby providing for length adjustment of the reach from the truck cab by the driver.

The device comprises expanding friction brake means fixed in longitudinal position within the inner telescoping reach. Openings are provided in the four (4) walls of the inner reach permitting the expanding friction means to contact the inner walls of the outer reach thereby locking the two reaches in a fixed position. Expansion of the friction means is accomplished by compressed air controlled from the cab of the truck.

DETAILED DESCRIPTION OF THE PREFERRED EMBODIMENTS

In the embodiment of the invention shown in FIGS. 2, 4, 5 and 6 the device is used within the telescoping reaches of a logging trailer 10, FIG. 1. The outer reach 12 connects to the trailer 10 and is adapted to receive the telescoping inner reach 14. The forward end of the inner reach 14 is provided with a telescoping shaft 16 which in turn connects to the coupling 18 of the tractor truck 20.

The end of the inner reach 14 FIG. 2 within the outer reach 12 is provided with openings 14a near the end and through each of the side walls of the reach 14. Fixed within the inner reach 14 is a support member 22 provided with a hole 22a at its center. An expandable friction device 24 is supported on tube 26 positioned within the inner reach 14 with the forward end of the tube 26 extending through the hole 22a of support member 22.

The device 24 comprises an expandable air chamber 28 having a central opening 28a through which the tube 26 extends to support the chamber 28. The fore and aft walls of the chamber 28 are contained between fore and aft plates 30 supported by the tube 26. Spaced from the plates 30 by collars 32 are fore and aft support plates 34 adapted to contact the inner walls of the reach 14 for support of the device 24 within the reach 14. The entire device 24 is retained in a longitudinal direction on the tube 26 by means of thrust collars 36 secured to the tube 26 by bolts 38.

Figure 4:
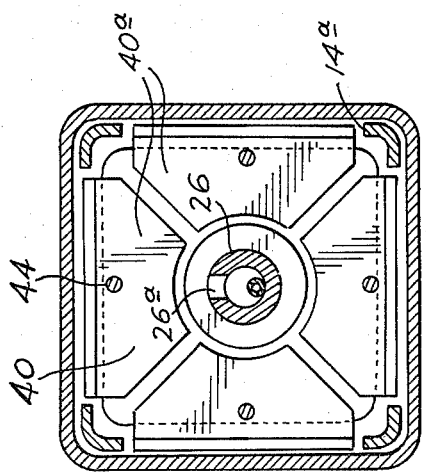
FIG. 4 is a transverse sectional elevational view along the line 4—4 of FIG. 2.

Surrounding the outside of the expandable chamber 28 are four U-shaped shoes 40 FIGS. 2 and 4. Each of the shoes 40 is provided with a friction surface such as brake lining 42 adapted to contact the inner surface of the outer reach 12 when the expandable chamber 28 is expanded. The shoes 40 are retained in position by studs 44 welded to each of the inwardly projecting legs 40a of the shoes 40. The studs 44 extend through slots 34a FIG. 5 in support plates 34. The shoes 40 are retained in contact with the expandable chamber 28 by means of elastic bands 46 surrounding the four studs 44 outside of the support plates 34.

Figure 6:
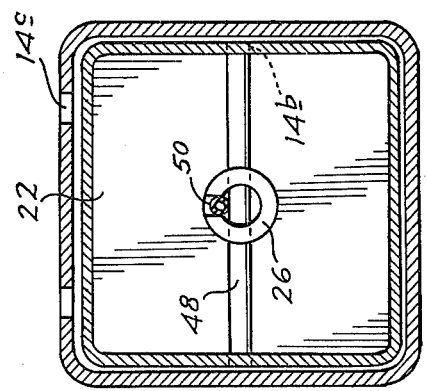
FIG. 6 is a transverse sectional elevational view along the line 6—6 of FIG. 2.
Figure 5:
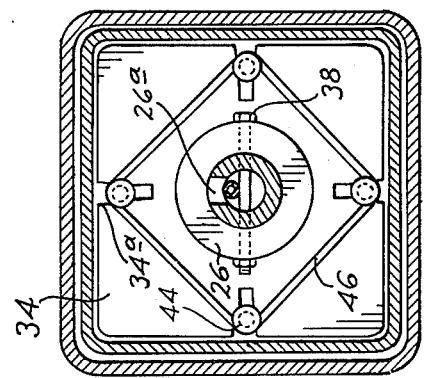
FIG. 5 is a transverse sectional elevational view along the line 5—5 of FIG. 2.

The tube 26 are thereby the entire device 24 is retained in longitudinal or axial position by means of pin 48 FIGS. 2 and 6 through a hole in the forward end of tube 26. To provide for insertion and retention of the pin 48, the inner reach 14 is provided with holes 14b in each of the vertical side walls in alignment with the hole in tube 26 to receive the pin 48. The pin 48 is inserted by drawing the inner reach 14 forward in relation to the outer reach 12 exposing the holes 14a in the inner reach.

Compressed air is supplied to the expandable chamber 28 by means of a hose 50 connected to the expandable chamber 28 by fitting 52. The fitting, elbow and hose are installed in the tube 26 by insertion through the slot 26a in FIGS. 4 and 5.

An alternate embodiment (not shown) of the expandable friction device 24 would be to terminate the inner reach 14 at the line 4—4 of FIG. 2 and increase the dimensions of the aft support plate 34 to contact the inner walls of the outer reach 12. This arrangement eliminates the need for the wall openings 14a in the inner reach 14.

To eliminate the possibility of the inner reach 14 being accidentally withdrawn from the outer reach 12 a pair of gravity-actuated locking pawls 54 are mounted on shaft 56 FIG. 2. The shaft 56 is pivotally supported in brackets 58 secured to the outer reach 12. The pawls 54 extend through openings 12a in the outer reach 12 and into the slotted openings 14c in the upper wall of the inner reach 14. When the inner reach is collapsed, the forward edge of the slotted openings 14c contacts the pawls 54 and swings them approximately 180 degrees where they ride on the upper surface of the inner reach 14. Should the inner reach be pulled forward relative to the outer reach, the pawls drop into the slots 14c and lock against the aft edge of the slotted openings as shown in FIG. 2 preventing the inner reach from being accidentally fully withdrawn from the outer reach.

In the embodiment shown a second device 24 FIG. 3 is positioned near the forward end of the inner reach 14 and connected to the telescoping shaft 16. Expansion of the chamber 28 causes the friction material 42 to contact the inner walls of the inner reach 14 thereby preventing the movement of the telescoping shaft 16 relative to the inner reach 14. The air hose 50 is provided with a tee 60 to connect with fitting 52 to supply compressed air to the expansion chamber 28. The shaft 16 is supported at its forward end in a bearing 62 and near the device 24 by wheels 64. The primary function of the wheels 64 is to provide rolling action from downward pressure on shaft 16 and to absorb side-pressure when the truck is moving around curves. The arrangement shown in FIG. 3 is disclosed in my prior patent U.S. Pat. No. 3,972,540.

The device as used in FIG. 2 for locking the inner reach 14 to the outer reach 12 may be used independently or in conjunction with the device as shown in FIG. 3. When used in conjunction with the device shown in FIG. 3 the application of compressed air by the truck operator expands both devices locking the telescoping shaft 16 to the inner reach 14 and locking the inner reach 14 to the outer reach 12.

OPERATION

In operation the truck-trailer combination may be returned to the loading site as a truck-trailer combination by depressurizing the devices 24 and telescoping the shaft 16 and the inner reach 14 to a minimum length. Applying pressure to the devices 24 would then lock the telescoping shaft 16 to the inner reach 14 and the inner reach 14 to the outer reach 12 permitting the trailer to be moved as a conventional trailer without a log load. Conventionally, the trailer is returned to the logging site riding piggy-back the truck. At the loading site, the trailer is unloaded from the truck and coupled to the truck along with the compressed air hose 50. The telescoping shaft 16 is normally pinned to the inner reach 14 by a pin 66 through the holes 62a and 16a FIG. 3.

With the trailer connected to the truck, the truck is then driven forward to the desired spacing between the truck and trailer. Air pressure is then applied to the friction devices by the truck operator through the compressed air hose 50 thereby locking the inner and outer reaches. The truck is then driven to position the truck-trailer combination at the loading site. To prevent movement of the inner and outer reaches when the device 24 is depressurized the locking screw 68 FIG. 1 is tightened against the inner reach preparatory to log loading. With the logs loaded on the truck and trailer bunkers the pin 66 is removed from shaft 16 causing the trailer to be drawn by the connection of the log load with the bunkers. The shaft 16 is free to telescope as required to permit the truck to turn corners. In the event the trailer is mired in loose dirt or is on a steep grade that would overcome the drawing capacity of the logs against the bunkers, compressed air is applied to the friction devices 24 permitting the draw of the truck to be applied to the trailer independent of the logs.

Having thus described my invention in preferred embodiments, I claim:

1. In combination with the elongated inner and outer hollow telescoping reaches of the trailer of a logging truck-trailer combination, wherein the outer cross sectional dimensions of the inner reach are slightly smaller than the inner cross sectional dimensions of the outer reach, a device for securing said telescoping reaches together releasably against longitudinal displacement, comprising:

(a) a transverse plate secured to and extending across the inner reach adjacent the inner end thereof, (b) an elongated support member secured at one end to the transverse plate and extending therefrom in the direction and on the longitudinal axis of the inner end of the inner reach, (c) laterally expansible and contractable friction means having a central longitudinal opening receiving the support member therethrough, the friction means including gripping means disposed for releasable engagement with the inner side walls of the outer reach, the friction means comprising (1) a resiliently expansible and contractable fluid pressure chamber member having a central longitudinal opening receiving the support member therethrough, (2) longitudinally spaced chamber containing members one at each end of the chamber member secured releasably to the support member against longitudinally outward displacement, (3) a plurality of peripherally spaced brake shoe members freely abutting the outer surfaces of the chamber member and having friction surfaces arranged to releasably engage the inner surfaces of the outer reach, (4) guide studs extending longitudinally from the opposite ends of the brake shoe members, and (5) guide slots in the chamber containing members freely receiving and guiding the guide studs therein, (d) connecting means securing the friction means to the support member whereby expansion and contraction of the gripping means locks the inner and outer reaches together releasably against relative longitudinal movement, and (e) operating means connected to the friction means for expanding and contracting the gripping means from a remote station.

2. The combination of claim 1 including an elastic band mounted on and surrounding the peripherally spaced guide studs at each end of the chamber member for maintaining the brake shoe members in contact with the chamber member.

3. In combination with elongated inner and outer telescoping members of a logging trailer reach, a device for securing said telescoping members together releasably against longitudinal displacement, comprising:

(a) an elongated support member secured at one end adjacent the inner end of the inner telescoping member and extending inwardly therefrom, (b) a resiliently expansible and contractable fluid pressure chamber member having a central longitudinal opening receiving the support member therethrough, (c) longitudinally spaced chamber containing members one at each end of the chamber member secured releasably to the support member against longitudinally outward displacement, (d) a plurality of peripherally spaced brake shoe members freely abutting the outer surfaces of the chamber member and having friction surfaces arranged to releasably engage the inner surfaces of the outer reach, (e) guide studs extending longitudinally from the opposite ends of the brake shoe members, and (f) guide slots in the chamber containing members freely receiving and guiding the guide studs therein.

4. The combination of claim 3 including an elastic band mounted on and surrounding the peripherally spaced guide studs at each end of the chamber member for maintaining the brake shoe members in contact with the chamber member.

5. In combination with the elongated inner and outer hollow telescoping reaches of the trailer of a logging truck-trailer combination and the elongated connector telescopically interconnecting said inner reach and the truck of said logging truck-trailer combination, means for securing said telescoping members together releasably against longitudinal displacement, comprising:

(a) a first elongated support member secured at one end adjacent the inner end of the inner reach and extending inwardly therefrom and on the longitudinal axis thereof, (b) a first laterally expansible and contractable friction means having a central longitudinal opening receiving the first support member therethrough, the friction means including gripping means disposed for releasable engagement with the inner side walls of the outer reach, (c) connecting means securing the first friction means to the first support member whereby expansion and contraction of the gripping means locks the inner and outer reaches together releasably against relative longitudinal movement, (d) a second elongated support member secured at one end to the inner end of said connector and extending therefrom into the inner reach on the longitudinal axis thereof, (e) a second laterally expansible and contractable friction means having a central longitudinal opening receiving the second support member therethrough, the friction means including gripping means disposed for releasable engagement with the inner side walls of the inner reach, (f) connecting means securing the second friction means to the second support member whereby expansion and contraction of the gripping means thereof locks the connector and inner reach together releasable against relative longitudinal movement, and (g) operating means connected to both first and second friction means for expanding and contracting them simultaneously from a remote station.

* * * * *